Figures 1, 2:
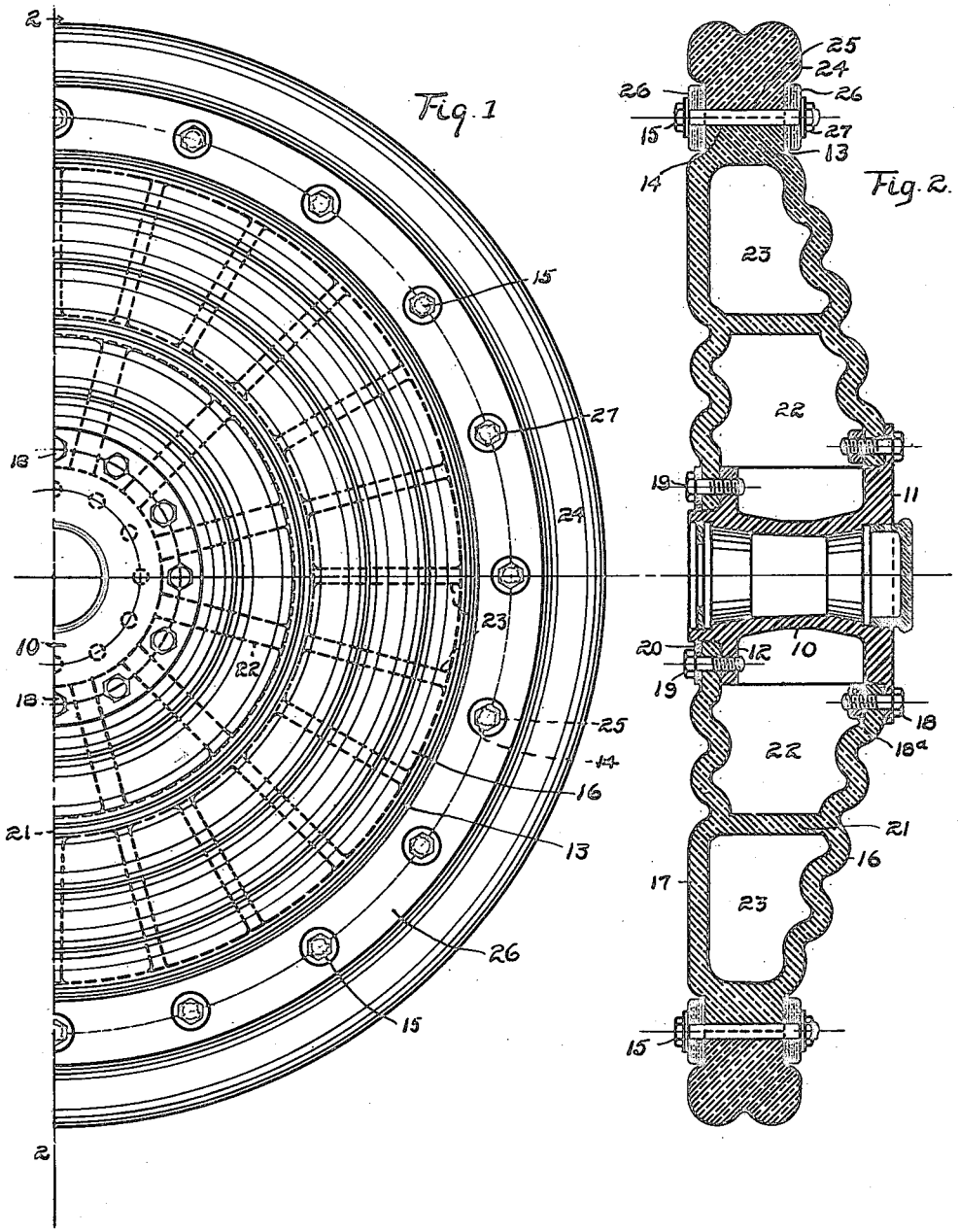

E. DEISTER.
AUTOMOBILE WHEEL.
APPLICATION FILED APR. 25, 1921.

1,432,540.

Patented Oct. 17, 1922.
2 SHEETS—SHEET 1.

Emil Deister
INVENTOR.

BY
ATTORNEY

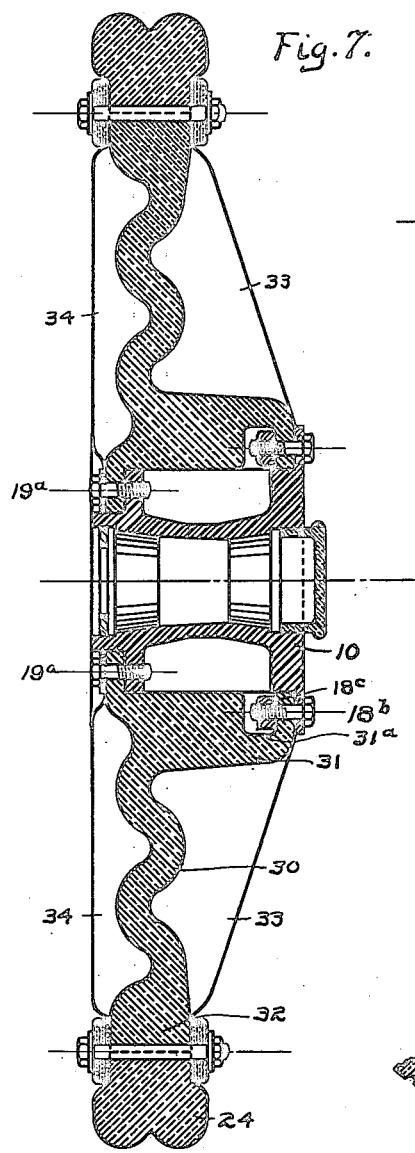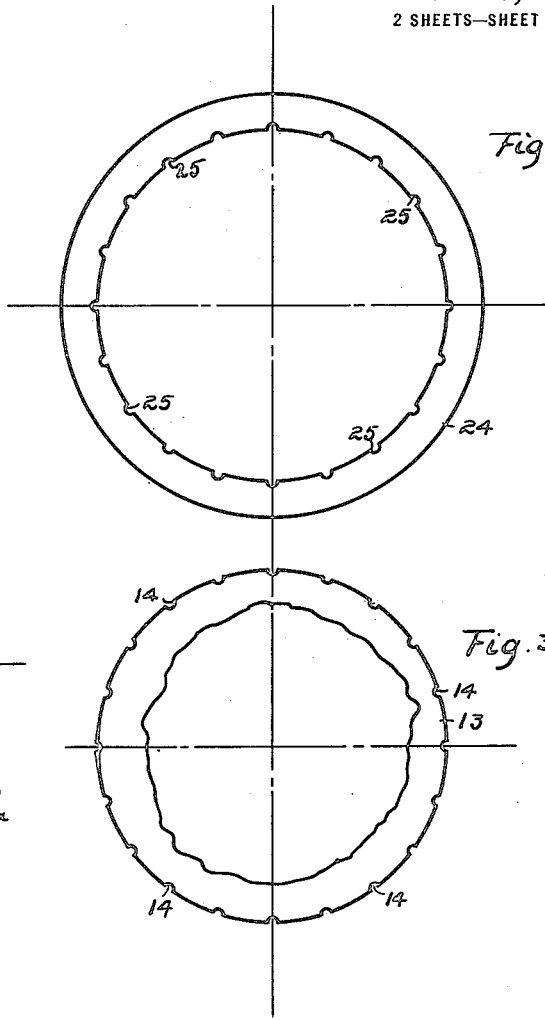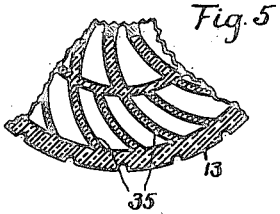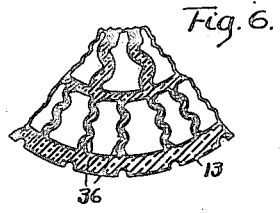

Patented Oct. 17, 1922.

1,432,540

UNITED STATES PATENT OFFICE.

EMIL DEISTER, OF FORT WAYNE, INDIANA.

AUTOMOBILE WHEEL.

Application filed April 25, 1921. Serial No. 464,469.

*To all whom it may concern:*

Be it known that I, EMIL DEISTER, a citizen of the United States, residing at Fort Wayne, in the county of Allen and State of Indiana, have invented new and useful Improvements in Automobile Wheels, of which the following is a specification.

The invention relates to wheels for automobiles and trucks. Heretofore numerous attempts have been made to eliminate pneumatic tires by supporting the wheel rim on the wheel hub by springs of various forms and constructions. The object of my invention is to provide a wheel of novel construction which has a high degree of elasticity and resiliency throughout and having great durability and in which the pneumatic tire and all resilient springs are eliminated.

In the accompanying drawings I have illustrated the invention in which—

Figure 1 is a fractional view in elevation of a wheel constructed in accordance with my invention; Fig. 2 a cross-sectional view on line 2—2 of Figure 1; Fig. 3 an elevational view of the wheel partly broken away and having the tire removed; Fig. 4 an elevational view of the tire; Fig. 5 a fractional vertical sectional view of a modified form of the wheel; Fig. 6 a fractional sectional view of another modified form of the wheel, and Fig. 7 a central cross-sectional view of another form of the invention.

Referring to the drawings, 10 is the hub of suitable form or of any suitable construction, having the annular flanges 11 and 12 at the opposite ends thereof. Rim 13 of the wheel is formed of suitable elastic material such as rubber or rubber and fabric vulcanized together. Grooves 14 are formed in the periphery of the rim at suitable intervals and are adapted to receive the bolts 15 as hereinafter explained. Plates or disks 16 and 17 formed of rubber or rubber and fabric and preferably integral with the rim 13 extend toward the opposite ends of the hub and they are preferably corrugated to afford strength and resiliency. The inner portion of the plate 16 is apertured to receive a series of bolts 18 which are passed through corresponding apertures in the flange 11 and thread into a sectional ring 18ª. The sections of the ring will be vulcanized on the plate or disk 16 or held in place thereon by countersunk screws inserted in the disk. The tightening of the bolts 18 clamps the plate between the flange and the ring sections. Similarly the inner portion of the plate or disk 17 is apertured to receive the bolts 19 adapted to be threaded into the flange 12, a plate or ring 20 being disposed on the bolts and bearing against the outer face of the plate or disk 17. The tightening of the bolts 19 clamps the plate 17 between the flange 12 and the ring 20 and securely holds the same in proper position on the hub.

An annular or endless web 21, preferably concentric with the rim 13, is integral with the plates or disks 16 and 17 or is vulcanized to one or both of them at a suitable point between the hub portions of the plates and the rim 13, and ribs 22 are preferably formed integral with the web 21 and with the plates 16 and 17. Ribs 23 connect the web 21 to the rim 13 and are preferably integral with the plates 16 and 17 and with both the rim and the web 21, or they may be vulcanized to the same as may be best in manufacturing the wheel. The object of the several ribs is to strengthen the wheel as a whole and to prevent collapse of the plates or disks and to increase the resiliency of the wheel, the rim, plates or disks and the several ribs being formed preferably of the same material. In Figs. 1 and 2 the ribs 22 and 23 are shown as radiating from the hub toward the rim, but they may be curved as shown at 35 in Fig. 5, or corrugated as shown at 36 in Fig. 6.

The tire 24 may be made in any form, the inner periphery thereof having transverse grooves 25 (Fig. 4) therein adapted to register with the grooves 14 in the rim 13 and to receive the bolts 15. Preferably the tire is solid, and when it is assembled on the rim 13 with the grooves 25 in register with the grooves 14 the rings 26 formed of elastic material such as rubber or rubber and fabric, are placed on opposite sides of the rim and tire and the bolts 15 are passed through suitable apertures in the rings and through the registered grooves, and the nuts 27 on the bolts, when tightened, clamp the rings tightly on both the rim and tire and secure the tire in position, the bolts cooperating with the grooves to prevent creeping of the tire on the rim.

It will be noted that the entire wheel, with the single exception of the hub and the transverse bolts, is formed of elastic material, which, as the wheel is in motion, will constantly absorb all shocks to the wheel caused by uneven or rough roads. Hence the wheel has greater resiliency than a pneumatic tired wheel and is highly useful for trucks and automobiles and entirely eliminates all springs in the wheel and all pneumatic tire difficulties and disadvantages.

In Fig. 7 I have illustrated a modification of the wheel wherein but one corrugated plate or disk 30 is used having a hub portion 31 secured to the hub 10 by the bolts 18ᵇ and 19ᵃ as before described, the hub portion being annularly recessed at 31ᵃ to receive a sectional ring 18ᶜ. A rim 32 is integral with the plate or disk 30 as before and a solid tire 24 is secured to the rim as before described. Ribs 33 and 34 project laterally from opposite sides of the plate or disk and are integral with the plate and also with the hub portion 31 and the rim. These ribs reinforce and strengthen the plate and prevent buckling or collapse of the same in use. The rim, plate or disk, the hub portion 31 and the ribs are formed of elastic material as before described and the wheel has a resiliency similar or identical with that of the wheel previously described and shown in Figs. 1 and 2.

What I claim is:

1. In a wheel, a hub, a rim, a plurality of non-metallic plates supporting the rim on the hub and an endles web between the the plates for reinforcing the same.

2. In a wheel, a hub, a rim, a plurality of resilient non-metallic plates supporting the rim on the hub and an endless web between the plates for reinforcing the plates.

3. In a wheel, a hub, a rim, a plurality of elastic non-metallic plates supporting the rim on the hub and an annular web and a plurality of transverse ribs between the plates for reinforcing the plates.

4. In a wheel, a hub, a rim, a plurality of elastic, non-metallic plates integral with the rim and secured to the hub and an annular web integral with the plates for reinforcing the plates.

5. In a wheel, a hub, a rim of elastic, non-metallic material, a plurality of corrugated elastic, non-metallic members supporting the rim on the hub, an annular web integral with the members and a plurality of ribs of elastic, non-metallic material extending from the rim toward the hub for reinforcing the members.

6. In a wheel, a rim of elastic material, a plurality of annularly corrugated elastic, non-metallic members integral with the rim and secured to the hub, and an annular web and a plurality of radial ribs integral with the members for reinforcing the members.

7. In a wheel, a hub, a rim having a plurality of transverse grooves in its periphery, a tire on the rim having a plurality of grooves in its inner periphery adapted to register with the grooves in the rim, rings on opposite sides of the tire and rim, bolts extended through the registering grooves and the rings for securing the tire on the rim and means supporting the rim on the hub.

8. In a wheel, a hub, a rim of elastic material having a plurality of transverse grooves in its periphery, a tire on the rim having a plurality of transverse grooves in its inner periphery adapted to register with the grooves in the rim, non-metallic rings on opposite sides of the rim and tire, bolts extended through the registering grooves and the rings for securing the tire on the rim and elastic non-metallic means supporting the rim on the hub.

In witness whereof I have hereunto subscribed my name this 22d day of April, 1921.

EMIL DEISTER.